United States Patent [19]

Gagne

[11] 4,174,207

[45] Nov. 13, 1979

[54] METHOD AND APPARATUS UTILIZING TRANSVERSELY INCLINED BARRIERS IN FLOAT GLASS FORMATION

[75] Inventor: Robert Gagne, New Kensington, Pa.

[73] Assignee: PPG Industries, Inc., Pittsburgh, Pa.

[21] Appl. No.: 928,046

[22] Filed: Jul. 26, 1978

[51] Int. Cl.² .............................................. C03B 18/02
[52] U.S. Cl. .................................. 65/99 A; 65/182 R
[58] Field of Search ............................. 65/99 A, 182 R

[56] References Cited

U.S. PATENT DOCUMENTS

| 3,479,171 | 11/1969 | Robinson et al. | 65/99 A |
| 3,503,728 | 3/1970 | Itakura | 65/99 A X |
| 3,607,199 | 9/1971 | Itakura et al. | 65/182 R |
| 3,615,315 | 10/1971 | Michalik et al. | 65/25 A |
| 3,618,623 | 11/1971 | Boaz | 65/99 A X |
| 3,925,051 | 12/1975 | Lawhon | 65/99 A |
| 3,930,828 | 1/1976 | Kunkle | 65/99 A |
| 3,930,829 | 1/1976 | Sensi | 65/99 A |
| 4,012,216 | 3/1977 | Marchand | 65/99 A |
| 4,092,140 | 5/1978 | Cerutti et al. | 65/182 R X |

Primary Examiner—Arthur D. Kellogg
Attorney, Agent, or Firm—Paul A. Leipold

[57] ABSTRACT

A method and apparatus for the formation of flat glass are disclosed. The invention involves the utilization of transversely inclined barriers in the molten metal bath of a flat glass forming chamber to create asymmetric currents in said bath.

18 Claims, 6 Drawing Figures

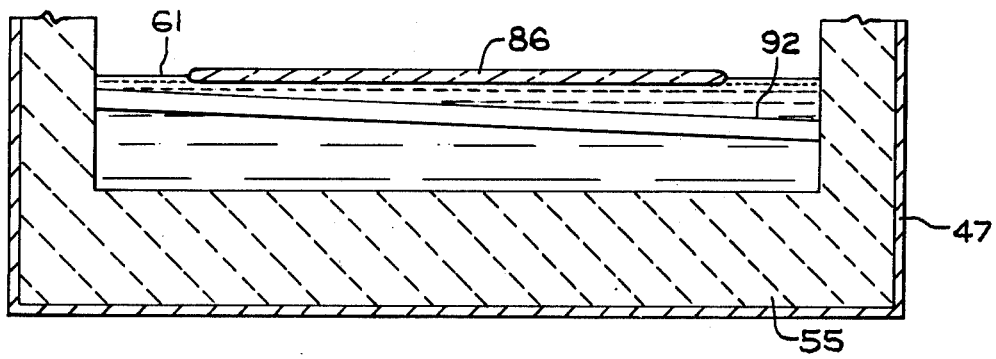
FIG. 3
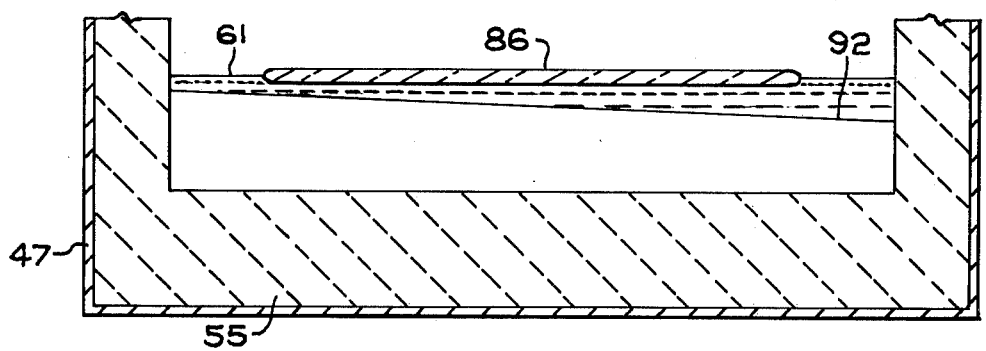
FIG. 4
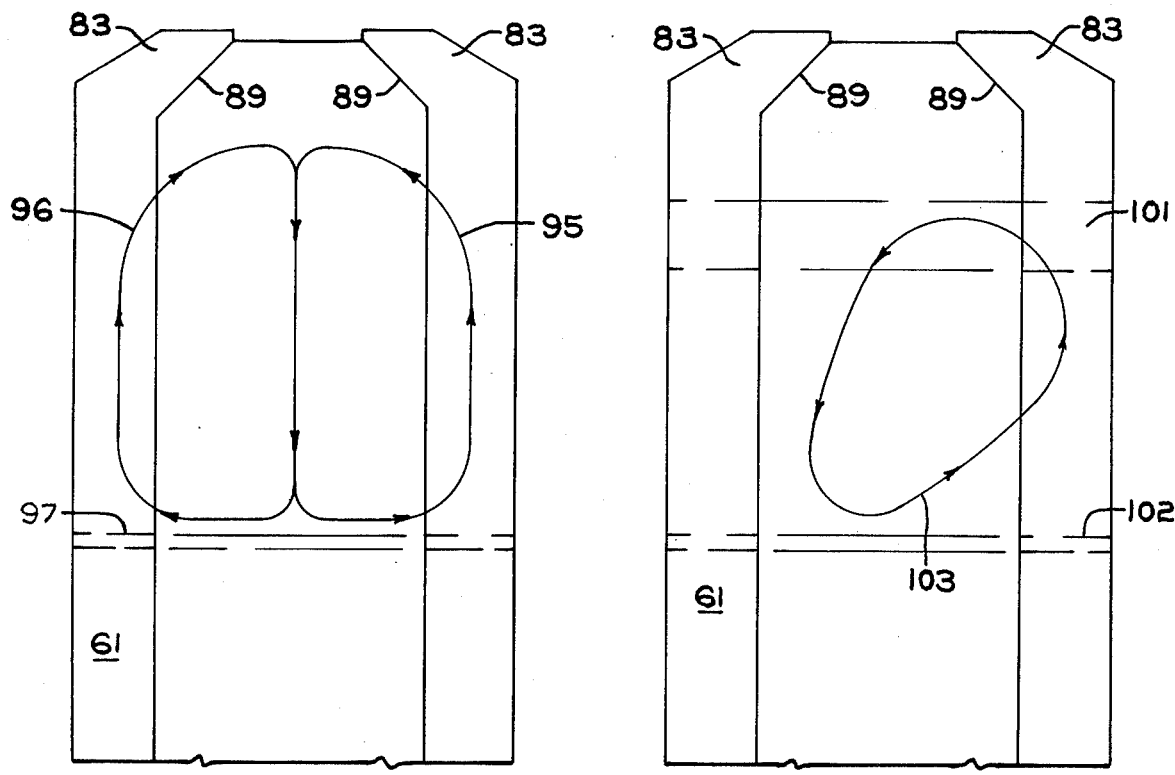
FIG. 5
FIG. 6

METHOD AND APPARATUS UTILIZING TRANSVERSELY INCLINED BARRIERS IN FLOAT GLASS FORMATION

BACKGROUND OF THE INVENTION

1. Field of the Invention

This invention relates to the art of manufacturing flat glass wherein molten glass is delivered onto a surface of a pool of molten metal and formed while floating on the molten metal into a continuous sheet of glass. More particularly, this invention relates to improved barriers positioned in the glass-supporting molten metal to control convection currents or flow of molten metal within the pool.

2. Brief Description of the Prior Art

The use of dam barriers to influence thermal conditions within a glass-supporting pool of molten metal in a glass-forming chamber has long been recognized. For example, U.S. Pat. No. 789,911 to Hitchcock discloses the use of a plurality of barriers to segregate a glass-supporting pool of molten metal into a plurality of pool segments, each of which may be selectively maintained at a desired temperature to permit the cooling and forming of glass as it passes over each segment of the pool during its travel through a forming chamber.

U.S. Pat. No. 3,317,302 to Misson discloses the use of dam barriers which are sufficiently beneath the glass-supporting surface of a pool of molten metal so that, while segregating the pool into several segments, they permit the flow of molten metal along the length of the forming chamber to a desired degree to effect the cooling of the glass during its formation.

U.S. Pat. No. 3,584,475 to Galey and Sensi discloses dam barriers extending transversely across the bottom of a glass-forming chamber which are contoured to provide for a greater inhibition of molten metal flow along the margins of a forming chamber than in the central portion of the forming chamber.

U.S. Pat. No. 3,930,829 to Sensi discloses the use of dam barriers in a forming chamber, some of which are positioned inwardly from the side walls of the forming chamber so that the flow of molten metal along the extreme marginal portions of the forming chamber is not inhibited by the presence of a dam barrier while the flow of molten metal throughout a major central portion of the forming chamber is inhibited by the presence of the dam barriers. In this patent, Sensi also discloses the use of short dam barriers which do not extend across the full width of a forming chamber such as dam barriers 280 shown in FIG. 14 of U.S. Pat. No. 3,930,829.

While the above inventions have lead to improved glass, they have not overcome the problem of longitudinal defects caused by uneven thickness of the glass that results because of uneven temperatures transversely across the glass during the ribbon forming of the float formation process. The methods of the prior art all require symmetrical barriers, dams or bottom pieces that produce either a single return and advance flow of molten metal or else matching flows of molten metal forward on each side of the top and backward along each side of the float bath. These flows may be either between adjacent dam barriers or along the surface and bottom of the entire tank of molten metal. These various currents all contribute to the longitudinal defects of the glass as the movement of the molten metal with the symmetrical dams and barriers of the prior art tends to produce a temperature effect at the middle of the molten metal bath. Therefore, there is a need for a float glass formation process which will eliminate the difficulty of a temperature gradient across the transverse direction of the glass as it moves through the float forming chamber and particularly the concentration of temperature difference at the middle of the sheet as it is formed producing the centerline and other longitudinal defects which are a thickness variation caused by the uneven cooling which the glass receives across the transverse direction from the tin or other molten metal.

SUMMARY OF THE INVENTION

It is an object of this invention to overcome the disadvantages of prior methods and apparatus.

It is an additional object of this invention to produce float glass of high optical quality.

It is another object of this invention to minimize the lateral thickness contour of the ribbon.

It is an additional object of this invention to minimize longitudinal defects.

It is a further additional object of this invention to reduce distortion caused by thickness differences across the glass.

It is another object of this invention to improve the optical qualities of float glass.

These and other objects of the invention are generally accomplished by causing an asymmetrical flow in the transverse direction in the molten metal bath. Asymmetrical flow of the molten metal is generally accomplished by the use of at least one barrier or dam that is inclined transversely within the molten metal.

In a preferred embodiment of the invention an inclined barrier is placed at the end of the forming region prior to the area of solidification of the glass. The barrier is placed transverse of the direction of glass movement and is inclined along its upper surface at a depth ratio of about 2 to about 3. The upper margin of the barrier is placed as close to the glass as possible without interfering with the movement of the glass.

BRIEF DESCRIPTION OF THE DRAWINGS

FIGS. 3 and 4 are traverse sectional elevations of a glass-forming chamber illustrating various embodiments of the barriers which may be employed as embodiments of this invention.

FIG. 5 is a partial plan view illustrating the current of the molten tin in a conventional float glass bath.

FIG. 6 illustrates the currents in the molten metal bath utilizing asymmetric-inclined barrier of the instant invention.

DESCRIPTION OF THE PREFERRED EMBODIMENTS

Figure 1:
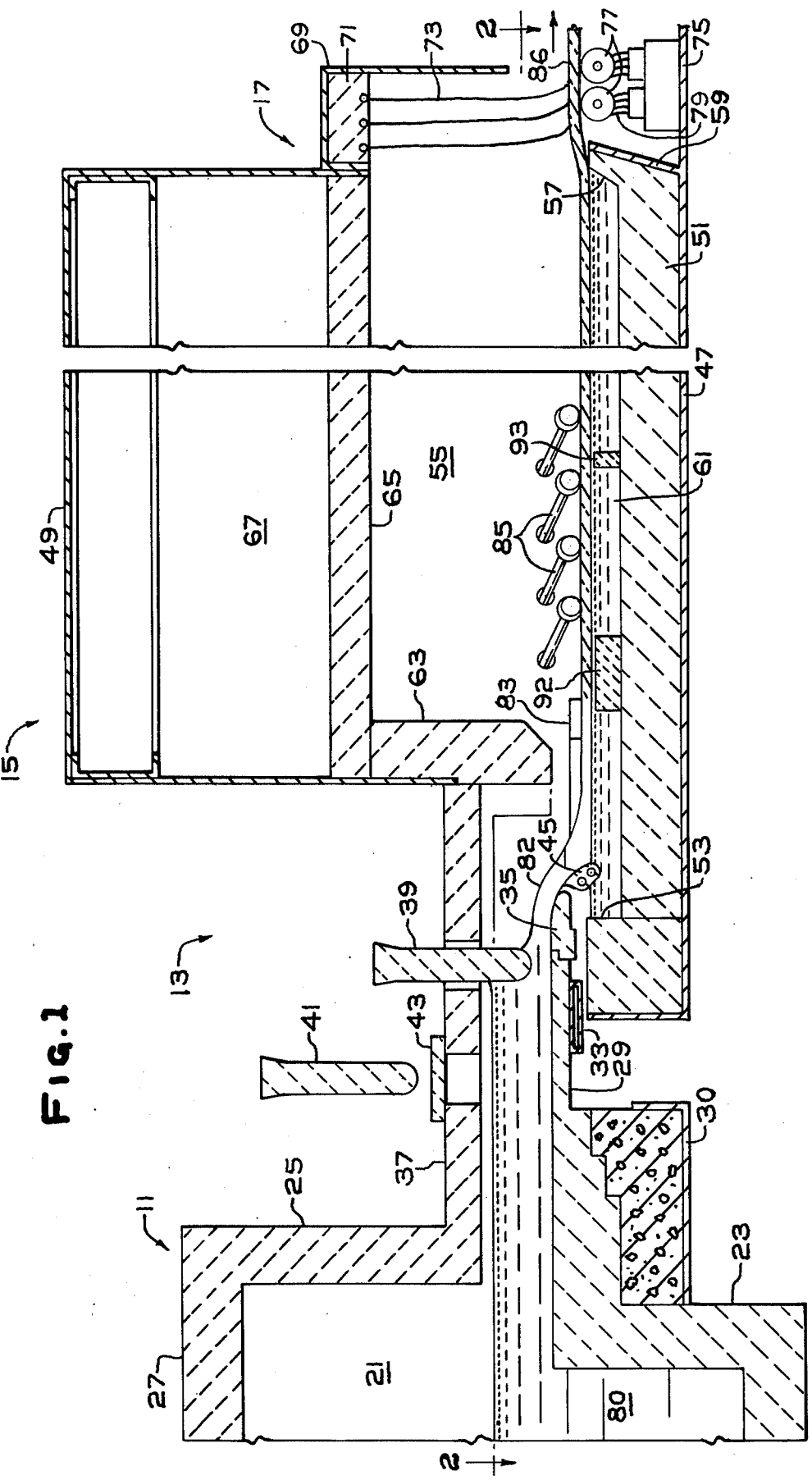
FIG. 1 is a longitudinal sectional elevation of a glassmaking apparatus employed in the practice of this invention.
Figure 2:
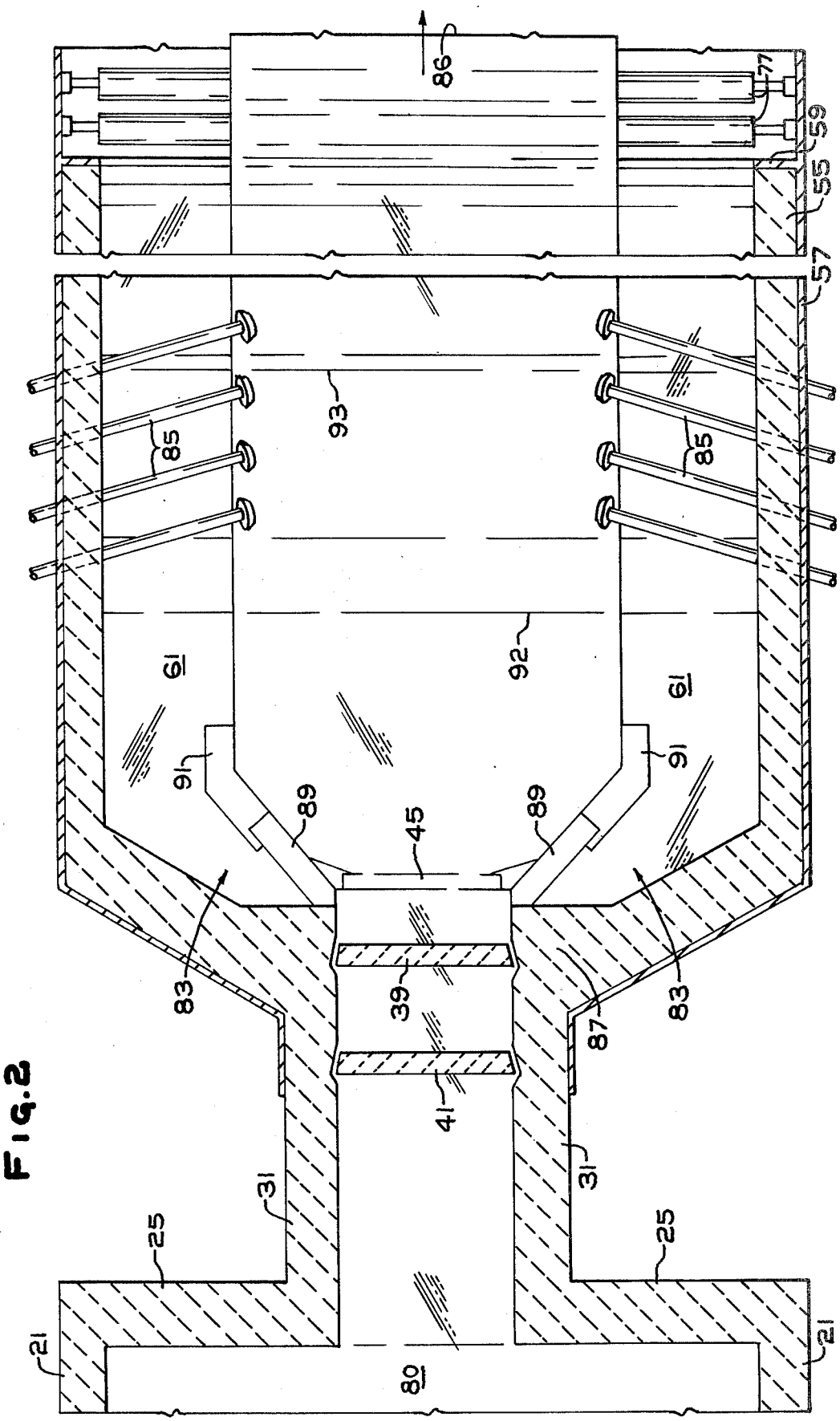
FIG. 2 is a sectional plan of a glassmaking apparatus shown in FIG. 1 taken along section line II—II of FIG. 1.

Referring to FIGS. 1 and 2, there is shown a glassmaking apparatus comprising a glassmaking furnace or tank 11 connected through a molten glass delivery facility 13 to a glass-forming chamber 15. The forming chamber 15 is, in turn, connected to a glass lift-out and removal facility 17. The glassmaking furnace 11 includes a furnace bottom 19, side walls 21, a front basin wall 23, an upper front wall 25, and a crown or roof 27 extending between the side walls. The glassmaking furnace 11 includes a melter (not shown) in addition to a conditioner which has its downstream or discharge end illustrated. The glassmaking furnace 11 serves to melt and refine glass and to condition the glass for delivery to the forming chamber 15.

The molten glass delivery facility 13 includes a canal bottom 29 and canal side walls 31 which together form a channel or canal through which molten glass can flow from the furnace 11 to the forming chamber 15. The canal bottom 29 may be mounted on a structure 33 which includes a cooler. The canal bottom 29 terminates with a lip 35 which is shown mounted above extending over a pool of molten metal in the forming chamber. The molten glass delivery facility 13 further includes a roof 37 having openings through it for receiving metering members or tweels. An operating tweel 39 is mounted to extend downwardly through an opening in the roof 37, it is mounted by means (not shown) for raising and lowering the tweel 39 to provide an opening of controlled size defined by the operating tweel 39, the canal bottom 29 and canal side walls 31 in order to meter or control the flow of molten glass from the furnace 11 through the canal to the forming chamber 15. A backup tweel 41 is also provided. It is mounted in a manner similar to the mounting for the operating tweel 39. It is employed to control the flow of molten glass during periods when the operating tweel is being replaced or under repair and is used to close off the flow of molten glass entirely during periods of maintenance of the forming chamber 15 or maintenance or replacement of the lip 35. A cover block or tile 43 may be provided over the opening for receiving the backup tweel 41 when the backup tweel 41 is removed from the canal.

A lip extension piece 45 may be mounted on the lip 35 to extend the surface which supports molten glass during its delivery. The surface which supports molten glass during its delivery can be positioned to contact a pool of molten metal in the forming chamber onto which molten glass is to be delivered.

The forming chamber 15 includes a bottom casing 47 and an upper casing 49 which together provide an enclosure for the chamber. Mounted within the bottom casing 47 is a bottom liner 51 of refractory material. Fixed across the inlet or upstream end of the forming chamber 15 is an end wall 53. Side walls 55 extend along the length of the forming chamber inside both the lower and upper casings. An exit end lip 57 extends across the exit end of the forming chamber and is mounted within an exit lip casing or plate 59.

A pool of molten metal 61, preferably tin or an alloy of tin, is contained inside the forming chamber in a container formed by the bottom liner 51, the hot end wall 53, the side walls 55, and the exit lip 57. A space called a headspace overlies the pool of molten metal 61 between the side walls of the forming chamber. A lintel 63 extends across the inlet of the forming chamber above the lip 35 and inside the upper casing 49. A ceiling or roof 65 extends from the lintel between the side walls 55 along the length of the forming chamber and separates the headspace from a plenum or service space 67 located above the roof 65 but within the upper casing 49.

The glass lift-out and removal facility 17 includes a canopy 69 which is provided with thermal insulation 71. The canopy 69 serves to support a plurality of drapes or curtains 73 which extend transversely across a path for glass removal and into close proximity to a conveyor for glass in order to seal the exit of the forming chamber from the outside environment. The lift-out facility 17 further includes a support 75 with lift-out rolls 77 mounted on it. The lift-out rolls 77 may be provided with seals 79.

During operation, a pool of molten glass 80 is maintained within the furnace 11. A stream of molten glass 82 is withdrawn from the furnace 11 and flows through the delivery facility 13 beneath the operating tweel 39 and over the lip 35 with its extension piece 45 directly onto the surface of the pool of molten metal 61 in the forming chamber. A pair of diverging guides 83 is preferably provided to confine the delivered molten glass and to establish a body of molten glass on the surface of the pool of molten metal 61 of desired width for forming into a continuous sheet of flat glass.

After the glass advances from between the diverging guides 83, it may be engaged along its marginal portions by edge rolls 85 which impose tractive and attenuating forces to the glass and serve to maintain or control its width as it is attenuated to a desired thickness as a dimensionally stable, continuous sheet or ribbon of glass 86. The continuous sheet of glass 86 is then removed from the pool of molten metal and from the forming chamber for further processing and use. The diverging guides 83 are preferably made of a material such as silica or alumina which is wet by glass. Each guide includes a diverging piece 89 as well as an end piece 91 to establish the width of the advancing glass. Preferably, the width of the glass advancing from between the guides is established as the width of the ribbon of glass 85 produced in the process. Throughout the present disclosure, the term "longitudinal" shall mean the direction substantially parallel to the direction of glass movement through the forming chamber from the upstream end to the downstream end of the chamber, while "transverse" shall mean a direction substantially perpendicular to the intended direction of glass movement and generally extending across the forming chamber from one side wall to the other. The molten glass passing through the forming chamber will be referred to interchangeably a ribbon or a sheet. It is acknowledged that the structure containing the molten metal both has been referred to in the art as the bath. However, in this specification the intent is to use the term "forming chamber" when referring to the structure containing the molten metal and only use the term "bath" to refer to the molten metal.

Extending traversely across the forming chamber 15 and submerged in the pool of molten metal 61 are barriers 92 and 93, which are in the embodiment illustrated in FIGS. 1 and 2. Dam barrier 93 has a generally horizontal surface extending the full width of the metal bath. Barrier 92 has a sloped upper surface that is highest at one margin sloping down to its lowest point at the opposite margin of the forming chamber.

In FIGS. 3 and 4 are illustrated variants of the sloping dam barrier 92. The barrier 92 illustrated in FIG. 3 comprises a barrier member that does not extend to the bottom of the metal bath and allows free flow of the molten metal underneath the barrier. In contrast, FIG. 4 represents a barrier that is extended from the bottom and forms a sloping surface almost in contact with the floating glass on one margin and sloping to a lowest point at the opposite margin. While FIGS. 3 and 4 illustrate contrasting types of barriers, both share the slanted profile of the upper surface and both are asymmetric such that they bring about the advantages of the system of the instant invention. It is within the scope of the invention that barriers with a sloping upper surface and having a formation between that illustrated by FIGS. 3 and 4 would be within the scope of the invention. For instance, the barrier member such as in FIG. 3 could be supported by several solid pieces extending to the bottom of the chamber but not being below the entire member so as to act as a dam.

Simulated model studies of a glass-forming chamber employing glycerin as a molten metal simulant and using methylene blue to trace the flow of molten metal simulant indicates that the asymmetric barriers of the invention cause a transversely non-symmetrical or asymmetric flow in the molten metal layer established beneath an advancing glass such that the longitudinal distortion is alleviated. While not wishing to be bound by any theory of why the instant invention is successful, the illustrations of FIGS. 5 and 6 set forth what is believed to be the flow of molten metal underneath the advancing glass which is the reason that centerline and other longitudinal defects of the glass are minimized. As illustrated by FIG. 5 in a prior art system with dam barrier 97, the flow of the molten tin is considered to be generally as indicated by the directional arrows 96 and 95 in two contacting oval patterns. In contrast, as illustrated in FIG. 6, the barrier of the invention 101 when used in combination with a conventional horizontally topped barrier 102 results in a molten metal flow in a generally large single eliptical pattern 103. This single large asymmetrical eliptical pattern spreads the heat more evenly by traverse tin flows under the floating glass and thereby eliminates the centerline and other longitudinal defects.

The material forming the barrier may be any material that is resistant to the temperatures and non-reactive with the metal utilized in the float glass bath. Among suitable materials are alumina, boro silicate material on a tungsten base, or a tungsten loaded carbon material.

The depth ratio of the barrier from the high side at one margin of the molten metal bath to the low side at the opposite side of the molten metal bath may be any depth ratio which results in reduced longitudinal distortion of the glass. It has been found that a preferred range of depth ratio is 2 to 3. Depth ratio is herein defined as the ratio of the depth of molten metal between the bottom of glass and the lower portion of the barrier at one glass ribbon margin and the depth of molten metal between the bottom of glass and the top portion of the barrier at the other glass ribbon margin. The preferred depth ratio gives a minimum of distortion in the float glass being formed. An optimum depth ratio has been found to be about 2.5 for best heat distribution under the float glass and least longitudinal direction distortion of the float glass as it is formed. An example of depth ratio determination would be if there is 3 mm depth of molten metal below the bottom of one glass ribbon margin and the top of the sloped barrier and 6 mm molten metal depth between the other glass ribbon margin and the top of the sloped barrier; then the depth ratio would be 2.

The barrier may be any size that produces the reduced distortion in the float glass being formed. A preferred length in the longitudinal direction of the chamber has been found generally for commercial float chambers to be about 2 foot to about 6 foot. The barrier may extend downward in the molten metal bath from a beam only several inches in vertical thickness to a complete dam barrier extending from the bottom of the molten metal bath. The upper surface of the high end of the barrier may be located as close as possible to the floating glass without touching the glass. A suitable distance for the high end has been found to be between about 2 and about 3 millimeters. The dimensions of the sloped barrier and the depth ratio may vary dependent on a number of factors including; the number of asymmetric barriers utilized, the location of horizontally topped dams in relation to the barriers, speed of glass movement and the depth of the molten metal in the particular chamber utilized.

While the barriers of the invention have been treated as monolithic pieces it is understood that it is within the invention to use other forming methods. The barriers may be formed of several sections joined to form or act as a single barrier unit. This type of construction is particularly suited for the barrier of FIG. 4 wherein the dam type sloped barrier could easily be formed of a series of sloped top blocks. Additionally it is within the invention to form the float chamber with a portion of the bottom of the chamber constructed with a slope to act as the sloping barrier of the invention.

The asymmetric sloped barriers of the invention may be located in any portion of the molten metal bath where the longitudinal distortion or uneven transverse temperature of the molten metal is a difficulty. A preferred location for any asymmetric barrier is prior to the area of solidification in the entry end of the bath. This area of preferred location is in that portion of the bath where the glass is undergoing changes in width and/or thickness. The glass at this area has not cooled to such an extent that it is no longer easily workable. It is theorized that the longitudinal defects result because areas transverse of the glass are not uniform in temperature due to the uneven molten bath temperature. These areas form longitudinal defects because as the glass is stretched wider and elongated, as the areas of higher temperature stretch to a greater degree than the lower temperature areas.

It is preferred that the asymmetric barrier of the invention be located prior to a horizontally topped dam barrier. The location in combination with a longitudinally following horizontally topped barrier creates a section of the molten metal bath in which currents induced by the asymmetric barrier may circulate.

The present invention while described in respect to a particular delivery means of molten glass to a float forming chamber is not limited to this particular delivery means and alternatively the system of the invention may be utilized in combination with a delivery means such as described in U.S. Pat. No. 3,220,816 to Pilkington wherein the glass is delivered down a long canal over a lip and caused to fall into a pool of molten metal where it is permitted to spread. The process and apparatus of the invention are also suitable for use with a unidirectional delivery system such as that of U.S. Pat. No. 3,843,346 Edge et al.

As will be apparent to those skilled in the art, the present system may be modified and equivalent elements or processes may be employed in combination therewith without departing from the spirit of this invention. For instance, consecutive opposite sloped barriers of the instant invention could be utilized to generate asymmetric currents. Further, the asymmetric barriers of the invention system could be utilized throughout the length of the glass-forming chamber alternated with conventional horizontally topped barriers.

Thus, the present disclosure of the preferred embodiments in the present invention is not intended to limit the scope of the applicant's invention.

I claim:

1. In a flat glass-forming chamber including an enclosed chamber containing a pool of glass-supporting molten metal, means for delivering molten glass onto the pool of molten metal at an inlet end, means for removing a continuous sheet of glass from the pool of molten metal and from the chamber at an outlet end, means for advancing glass along the surface of the molten metal from the inlet end to the outlet end of the chamber while forming it into a continuous sheet of desired width and thickness and means for removing heat from the glass during its advance and for removing heat from the chamber, wherein there is provided in the pool of molten metal at least one barrier over which the glass can advance, the improvement which comprises:

an asymmetric barrier extending traversely of said chamber beneath said molten metal wherein the upper surface of said barrier is close to the surface on one margin of said molten metal bath and slopes transversely to farther below the surface of said metal at the other margin to create asymmetric flow transverse of the bath.

2. The glass-forming chamber according to claim 1 wherein a symmetric transverse barrier is spaced longitudinally toward the outlet from said asymmetric barrier.

3. The chamber of claim 1 wherein the depth ratio of said asymmetric barrier is between about 2 and 3.

4. The chamber of claim 1 wherein the depth ratio of said asymmetric barrier is about 2.5.

5. The chamber of claim 1 wherein there are provided a plurality of barriers, each extending traversely across the chamber and each longitudinally spaced from the next barrier wherein some of said barriers are symmetric and some are asymmetric.

6. The chamber of claim 1 wherein horizontally topped symmetric barriers and asymmetric barriers are longitudinally alternated.

7. The chamber of claim 1 wherein each of said asymmetric barriers is not located longitudinally next to another asymmetric barrier.

8. The chamber of claim 1 wherein said asymmetric barrier is located such that said margin close to the surface of said molten metal is located as close as possible to said advancing glass without touching said glass.

9. The chamber of claim 1 wherein said asymmetric barrier has a longitudinal length of between about 2 and about 6 feet.

10. The chamber of claim 1 wherein said asymmetric barrier extends to the bottom of said pool of molten metal.

11. The chamber of claim 1 wherein said asymmetric barrier comprises a beam.

12. The chamber of claim 1 wherein the higher side of said asymmetric barrier is between about 2 and about 3 millimeters below the bottom of said glass sheet.

13. The chamber of claim 1 wherein said asymmetric barrier forms a part of the forming chamber bottom.

14. In a method of improving longitudinal distortion in the making of flat glass comprising the steps of delivering molten glass onto the surface of a pool of molten metal in an enclosed forming chamber, advancing the glass in a layer along a path on the surface of the pool of molten metal from an inlet region to an outlet region while cooling the glass and applying forces to it to form it into a dimensionally stable, continuous sheet of glass and removing the continuous sheet of glass from the surface of the pool of molten metal and from the forming chamber wherein the molten metal upon which the glass advances has flows within it along paths which are at least partially aligned with the path of glass advance, including both flows with and flows counter to the advance of the glass, the improvement which comprises providing an asymmetric barrier sloping transversely of said chamber beneath said molten metal creating molten metal flows that are asymmetric transverse of said chamber.

15. The method of claim 14 wherein the asymmetric flow of said molten metal in the direction of the advancing glass is skewed to the margin longitudinally beyond and in line with the higher side of an asymmetric barrier and return flow is skewed to the margin of the lower side of said asymmetric barrier.

16. The method of claim 14 wherein the asymmetric molten metal flows are between said asymmetric barrier and a symmetric barrier.

17. The method of claim 15 wherein said path of glass advance is about 2 to about 3 millimeters above said higher side of said asymmetric barrier.

18. The method of claim 15 wherein the depth ratio of said asymmetric barrier is about 2 to about 3.

* * * * *

UNITED STATES PATENT AND TRADEMARK OFFICE
CERTIFICATE OF CORRECTION

PATENT NO. : 4,174,207
DATED : November 13, 1979
INVENTOR(S) : Robert Gagne

It is certified that error appears in the above-identified patent and that said Letters Patent are hereby corrected as shown below:

Column 7, line 42, Claim 7, "The chamber of claim 1" should be --The chamber of claim 6--.

Signed and Sealed this

Twenty-first Day of October 1980

[SEAL]

Attest:

SIDNEY A. DIAMOND

Attesting Officer

Commissioner of Patents and Trademarks